(12) United States Patent
Han

(10) Patent No.: US 8,651,755 B2
(45) Date of Patent: Feb. 18, 2014

(54) CAMERA MODULE

(75) Inventor: Kwangjoon Han, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/819,652

(22) PCT Filed: Jun. 28, 2011

(86) PCT No.: PCT/KR2011/004687
§ 371 (c)(1),
(2), (4) Date: Feb. 27, 2013

(87) PCT Pub. No.: WO2012/030060
PCT Pub. Date: Mar. 8, 2012

(65) Prior Publication Data
US 2013/0156414 A1  Jun. 20, 2013

(30) Foreign Application Priority Data
Aug. 31, 2010  (KR) .................. 10-2010-0085133

(51) Int. Cl.
*G03B 9/08* (2006.01)
(52) U.S. Cl.
USPC ......................................................... 396/463
(58) Field of Classification Search
USPC ......................................................... 396/463
See application file for complete search history.

(56) References Cited

U.S. PATENT DOCUMENTS

| 3,834,761 | A | * | 9/1974 | Ray et al. ................. 299/10 |
| 5,839,555 | A | * | 11/1998 | Hsieh ...................... 192/223.1 |
| 6,418,278 | B1 | * | 7/2002 | Bittner .................... 396/195 |
| 2005/0218736 | A1 | * | 10/2005 | Message et al. ........... 310/90.5 |

FOREIGN PATENT DOCUMENTS

| JP | 2001-75146 A | 3/2001 |
| JP | 2006-258867 A | 9/2006 |
| JP | 2008-26692 A | 2/2008 |
| JP | 2008-96945 A | 4/2008 |

* cited by examiner

*Primary Examiner* — Clayton E Laballe
*Assistant Examiner* — Linda B Smith
(74) *Attorney, Agent, or Firm* — Birch, Stewart, Kolasch & Birch, LLP

(57) ABSTRACT

The present invention relates to a camera module including: a shutter including a blocking unit for blocking progress of light, a fixing unit for preventing arbitrary motion of the blocking unit, and a magnet for rotating the blocking unit; a pair of electromagnets mounted about the magnet to rotate the magnet in response to changes in magnetic polarity; and a cylindrical fixing pole for providing an axis for rotating the magnet, wherein the magnet comprises a hole, the hole for inserting the fixing pole being formed through a portion adjacent to a center of the magnet.

13 Claims, 3 Drawing Sheets

CAMERA MODULE

TECHNICAL FIELD

The teachings in accordance with the exemplary embodiments of this invention relate generally to a camera module, and more particularly to a MEMS (Micro Electro Mechanical Systems) camera module having a camera module improved in structure for preventing silicon shutter from being damaged or broken.

BACKGROUND ART

Generally, a compact small-sized camera module is applied to various multimedia fields including notebook type personal computers, camera phones, PDAs (Personal Digital Assistants), Smartphones and toys, and to image input equipment including monitoring cameras and information terminals.

The camera module is manufactured employing an image sensor or a photoelectric conversion device such as a CCD (Charge Coupled Apparatus) type or a CMOS (Complementary Metal Oxide Semiconductor). The camera module is also manufactured with focus adjustment function for adjusting size of an image. At this time, the camera module includes a shutter to allow light of an object to pass through an aperture, and a plurality of lenses.

The shutter is a mechanical device capable of adjusting an amount of light reaching an image sensor through the lenses. FIG. 1 is a schematic view of a shutter of a camera module according to prior art, and FIG. 2 is a schematic view for explaining problems that occur during operation of a shutter on a camera module according to prior art.

Referring to FIGS. 1 and 2, a shutter (30) includes a blocking unit (31) for blocking incidence of light to an image sensor, a fixing unit (33) for preventing an arbitrary motion of the blocking unit (31), and a connection unit (32) for connecting the blocking unit (31) and the fixing unit (33). On the drawings, a bottom surface of the connection unit (32) and the fixing unit (33) is mounted with a magnet (10') for rotating the blocking unit (31), and a vicinity of the magnet (10') is formed with a pair of electromagnets (50) for rotating the magnet (10') in response to changes in polarity.

The fixing unit (33) that takes the shape of a plate is fixed to an anchor (42) to allow at least two points to be fixed, and to prevent the blocking unit (31) from moving arbitrarily. The fixing unit (33) includes a plurality of holes (34) removed of remaining parts except for a basic frame and an elastically deformed unit (34a). The fixing unit (33) is bent with elasticity by the rotation of the magnet (10'), and in a case a power to the electromagnet (50) is cut off, the fixing unit (33) rotates the magnet (10') counter-clockwise in response to the elasticity to allow the blocking unit (31) to return to an original state.

The magnet (10') is formed with a fixing pole (20') that penetrates a center thereof, and is rotated by the power applied to the electromagnet (50) about a center axis of the fixing pole (20').

The shutter (30) of the camera module thus configured is such that the blocking unit (31) is rotated by rotation of the magnet (10'), where collision occurs with peripheral devices during rotation, and whereby the relevant collision parts and a part contacted by the connection unit (32) and the fixing unit (33) disadvantageously cause destruction due to repeated collision and structural stress.

That is, the magnet (10') is rotated by the power applied to the electromagnet (50) which is in turn affected by a simple repeated application and release of power and cannot accurately control the rotation of the magnet (10'). As illustrated in FIG. 2, a collision occurs, and if the collision is repeated, the structural stress accumulates to disadvantageously cause destruction of the shutter.

DISCLOSURE OF INVENTION

Technical Problem

The present invention is directed to solve the aforementioned problems or disadvantages by improving a structural configuration of a shutter, whereby collision with other structural objects generated in the course of operation and release of the operation in the shutter can be prevented in advance to fundamentally block generation of destruction.

Technical problems to be solved by the present invention are not restricted to the above-mentioned, and any other technical problems not mentioned so far will be clearly appreciated from the following description by skilled in the art.

Solution to Problem

An object of the invention is to solve at least one or more of the above problems and/or disadvantages in whole or in part and to provide at least the advantages described hereinafter. In order to achieve at least the above objects, in whole or in part, and in accordance with the purposes of the invention, as embodied and broadly described, and in one general aspect of the present invention, there is provided a camera module, the camera module comprising: a shutter including a blocking unit for blocking progress of light, a fixing unit for preventing arbitrary motion of the blocking unit, and a magnet for rotating the blocking unit; a pair of electromagnets mounted about the magnet to rotate the magnet in response to changes in magnetic polarity; and a cylindrical fixing pole for providing an axis for rotating the magnet, wherein the magnet comprises a hole, the hole for inserting the fixing pole being formed through a portion adjacent to a center of the magnet, whereby the magnet is mounted such that the hole is inserted by the fixing pole, the fixing pole includes at least one more lugs that are radially protruded, and the magnet includes a rotation guide unit that provides a space for causing the lug of the fixing unit to rotate by being radially extended and removed from the hole, where the removal is partially implemented to restrict the rotation.

Preferably, a plurality of lugs in the fixing pole is formed, and the rotation guide unit of the magnet is formed in the same number as that of the lugs.

Preferably, the shutter is formed with silicon.

Preferably, each of the lugs at the fixing pole is discrete at an equi-angle from a center of the fixing pole, and the rotation guide unit of the magnet has a predetermined angle of scope based on the center of the hole and is discretely formed at an even angle.

Preferably, the fixing unit taking the shape of a plate has at least two or more fixing points, and includes an elastically deformed unit formed with a hole to be elastically bent to a counter rotating direction when a power is applied to the electromagnet to rotate the magnet.

Advantageous Effects of Invention

The camera module according to the present invention has an advantageous effect in that a structural configuration of a shutter is improved, whereby collision with other structural objects generated in the course of operation and release of the operation in the shutter can be prevented in advance to fundamentally block generation of destruction and to enhance a structural reliability.

BRIEF DESCRIPTION OF DRAWINGS

The teachings of the present invention can be readily understood by considering the following detailed description in conjunction with the accompanying drawings, in which.

BEST MODE FOR CARRYING OUT THE INVENTION

Figure 1:
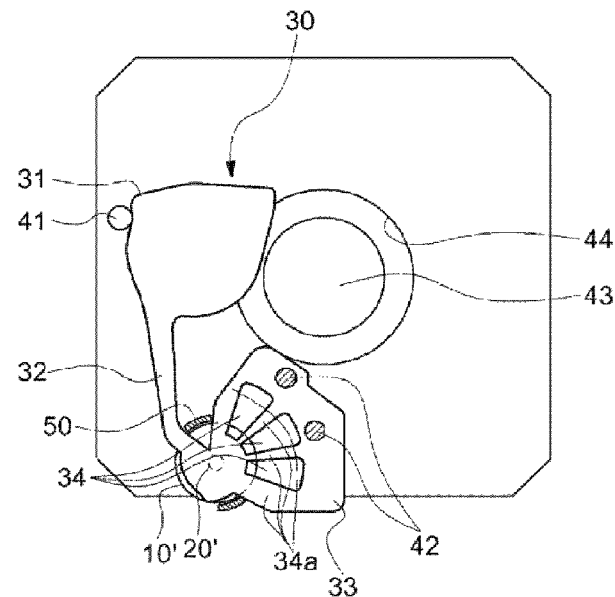
FIG. 1 is a schematic view of a shutter of a camera module according to prior art.

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application (s) or use(s) of the present invention.

The disclosed embodiments and advantages thereof are best understood by referring to FIGS. 1-5 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

Words such as "thereafter," "then," "next," etc. are not intended to limit the order of the processes; these words are simply used to guide the reader through the description of the methods.

It will be understood that when an element is referred to as being "connected" or "coupled" to another element, it can be directly connected or coupled to the other elements or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

Figure 3:
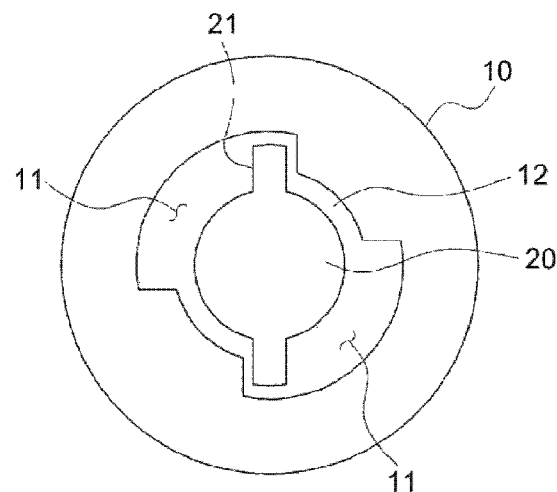
FIG. 3 is a schematic view illustrating a magnet and a fixing pole of a shutter inside a camera module according to an exemplary embodiment of the present invention.
Figure 4:
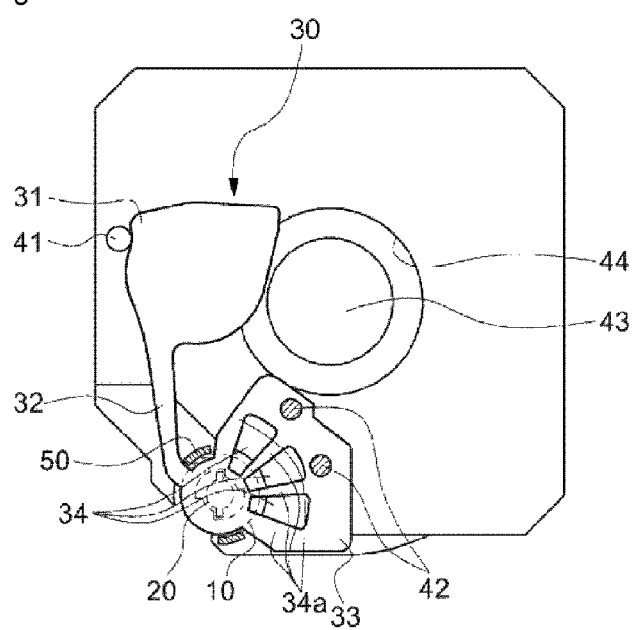
FIG. 4 is a schematic view illustrating an operation of a camera module in normal state according to an exemplary embodiment of the present invention.
Figure 5:
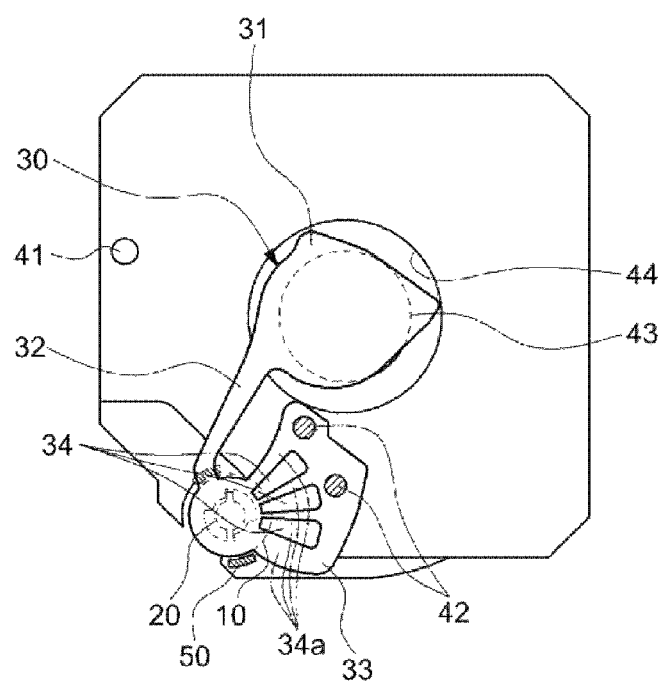
FIG. 5 is a schematic view illustrating an operation of a camera module in operation state according to an exemplary embodiment of the present invention.

FIG. 3 is a schematic view illustrating a magnet and a fixing pole of a shutter inside a camera module according to an exemplary embodiment of the present invention, FIG. 4 is a schematic view illustrating an operation of a camera module in normal state according to an exemplary embodiment of the present invention, and FIG. 5 is a schematic view illustrating an operation of a camera module in operation state according to an exemplary embodiment of the present invention.

Figure 2A:
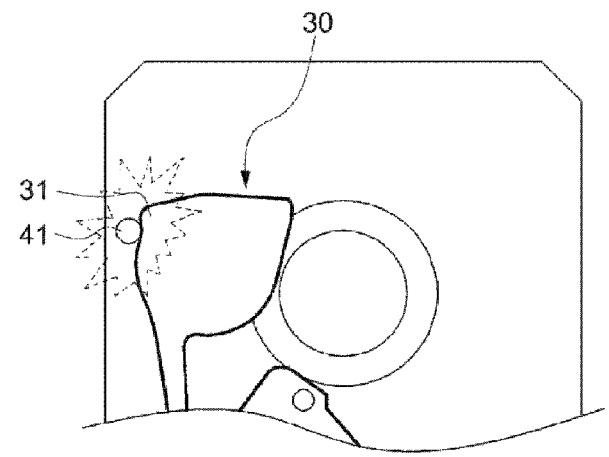
FIG. 2 is a schematic view for explaining problems that occur during operation of a shutter on a camera module according to prior art.
Figure 2B:
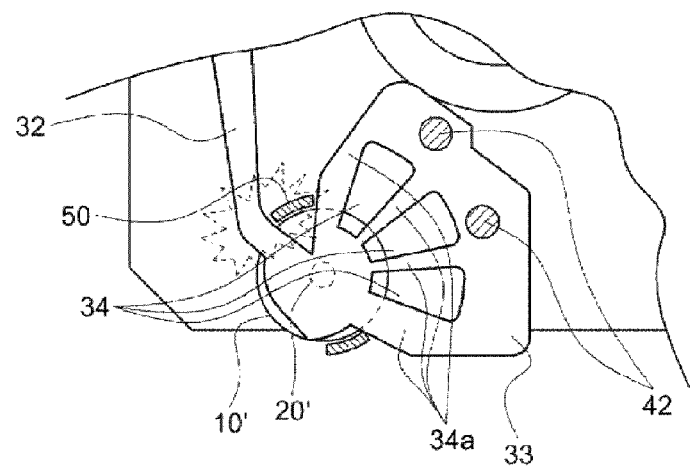
Figure 2C:
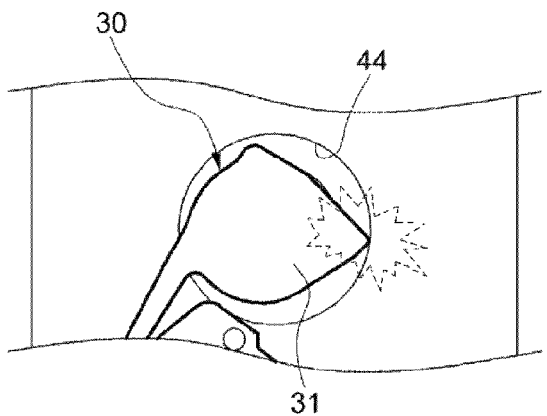

Referring to FIG. 3, a difference between a conventional camera module illustrated in FIGS. 1 and 2 and a camera module according to an exemplary embodiment of the present invention is that a magnet (10) mounted on a shutter (30) and shape of a fixing pole (20) formed at a peripheral structural device are improved to prevent in advance the shock from being applied to the shutter (30) disclosed in FIG. 2.

That is, two lugs (21) are formed to a radial direction of the fixing pole (20), and a rotation guide unit (11) is further formed about a hole (12) of the magnet (10) into which the fixing pole (20) is inserted for providing a rotation space of the lugs (21).

The rotation guide unit (11) is extensively removed to a radial direction from the hole (12), and only a part about the hole (12) is removed to allow the lug to be hitched by a distal end of the rotation guide unit (11) in consideration of position of the blocking unit (31) at the shutter (30) while the lug (21) at the fixing pole (20) is rotated.

That is, when the fixing pole (20) is rotated clockwise and counterclockwise on the drawings of FIGS. 3 and 4, the rotation guide unit (11) is formed in consideration of position movement to allow the blocking unit (31) of the shutter (30) to block a through hole (43), to function as a shutter, and to return to an original position.

Mode for the Invention

Referring to FIGS. 4 and 5, where FIG. 4 illustrates an original position state of the blocking unit (31) where the lug (21) of the fixing pole (20) straddles on a distal end of the rotation guide unit (11). At this time, when an electromagnet (50) is applied with power to rotate the magnet (10), the fixing unit (33) of the shutter (30) is such that an elastically deformed unit (34a) is deformed by a hole (34) to elastically be bent to a counter rotation direction, and a connection unit (32) is rotated counterclockwise to allow the blocking unit (31) formed at a distal end of the connection unit (32) to block the light irradiated to an image sensor (not shown) through a through hole (43).

At this time, a lug (21) of the fixing pole (20) is hitched at the other distal end of the rotation guide unit (11) to be restricted in additional rotation, and if the power of the electromagnet (50) is released, the lug is rotated counterclockwise on the drawing by elasticity of the fixing unit (33). Likewise, the lug (21) of the fixing pole (20) is hitched at a distal end of the rotation guide unit (11) to be restricted in additional rotation, whereby the conventional collision with a stopper or the like is not generated.

Although the exemplary embodiment of the present invention has described a case where two lugs of the fixing pole (20) are formed, and the rotation guide units are formed in the corresponding same number (2) as that of the lugs, the description is not limited thereto. For example, it should be appreciated by the skilled in the art that the operation can be performed with one rotation guide unit formed at a position corresponding to that of one lug, and the plural number of rotation guide units and fixing units may also perform the same operation.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The camera module according to the present invention has an industrial applicability in that it can be applied to various multimedia fields including notebook type personal computers, camera phones, PDAs (Personal Digital Assistants), Smartphones and toys.

The invention claimed is:

1. A camera module, the camera module comprising:
a shutter including a blocking unit for blocking progress of light, a fixing unit for preventing arbitrary motion of the blocking unit, and a magnet for rotating the blocking unit;
a pair of electromagnets mounted about the magnet to rotate the magnet in response to changes in magnetic polarity; and
a cylindrical fixing pole for providing an axis for rotating the magnet, wherein the magnet comprises a hole, the hole for inserting the fixing pole being formed through a portion adjacent to a center of the magnet, whereby the magnet is mounted such that the hole is inserted by the fixing pole, the fixing pole includes at least one more lugs that are radially protruded, and the magnet includes a rotation guide unit that provides a space for causing the lug of the fixing unit to rotate by being radially extended and removed from the hole, where the removal is partially implemented to restrict the rotation.

2. The camera module of claim 1, wherein a plurality of lugs in the fixing pole is formed, and the rotation guide unit of the magnet is formed in the same number as that of the lugs.

3. The camera module of claim 1, wherein the shutter is formed with silicon.

4. The camera module of claim 2, wherein each of the lugs at the fixing pole is discrete at an equi-angle from a center of the fixing pole, and the rotation guide unit of the magnet has a predetermined angle of scope based on the center of the hole and is discretely formed at an even angle.

5. The camera module of claim 1, wherein the fixing unit taking the shape of a plate has at least two or more fixing points, and includes an elastically deformed unit formed with a hole to be elastically bent to a counter rotating direction when a power is applied to the electromagnet to rotate the magnet.

6. A camera module, the camera module comprising:
a shutter including a blocking unit for blocking progress of light, a fixing unit integrally formed with the blocking unit, and a magnet formed at a distal end of the fixing unit;
a pair of electromagnets mounted about the magnet to rotate the magnet in response to changes in magnetic polarity; and
a cylindrical fixing pole for providing an axis for rotating the magnet about a rotation center of the fixing unit, wherein the fixing pole is formed with a plurality of lugs for restricting the rotation of the magnet.

7. The camera module of claim 6, wherein the magnet comprises a hole, the hole for inserting the fixing pole being formed through a portion adjacent to a center of the magnet.

8. The camera module of claim 7, wherein the hole includes a rotation guide unit for restricting the rotation of the fixing pole by contacting the lug.

9. The camera module of claim 8, wherein the rotation guide unit is formed with a hitching sill for restricting the rotation of the fixing pole by contacting the lug at a predetermined section of the hole.

10. The camera module of claim 9, wherein at least two lugs are provided at the fixing pole, and the hitching sill provided at the rotation guide unit of the magnet is provided in the same corresponding number as that of the lugs.

11. The camera module of claim 10, wherein the shutter is formed with silicon.

12. The camera module of claim 11, wherein each of the lugs of the fixing pole is equiangularly discrete relative to a center of the fixing pole, and the hitching sill provided at the rotation guide unit of the magnet is formed at the same angle as that of the lug based on a center of the hole.

13. The camera module of claim 12, wherein the fixing unit taking the shape of a plate has at least two or more fixing points, and includes an elastically deformed unit formed with a hole to be elastically bent to a counter rotating direction when a power is applied to the electromagnet to rotate the magnet.

* * * * *